(12) United States Patent
Ishizaka et al.

(10) Patent No.: US 7,421,997 B2
(45) Date of Patent: Sep. 9, 2008

(54) OUTBOARD ENGINE UNIT

(75) Inventors: Kazuhiro Ishizaka, Wako (JP); Toru Kimura, Wako (JP); Takeshi Inaba, Wako (JP); Hiroshi Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/730,261

(22) Filed: Mar. 30, 2007

(65) Prior Publication Data
US 2007/0266988 A1    Nov. 22, 2007

(30) Foreign Application Priority Data

| Mar. 31, 2006 | (JP) | ............................. 2006-097421 |
| May 1, 2006 | (JP) | ............................. 2006-127560 |
| May 1, 2006 | (JP) | ............................. 2006-127596 |

(51) Int. Cl.
*F02B 77/04* (2006.01)
*F02M 25/00* (2006.01)
*F02M 35/02* (2006.01)

(52) U.S. Cl. .............................. 123/198 E; 123/195 P; 123/572; 123/198 R

(58) Field of Classification Search .................. 440/77, 440/76, 61 S; 123/195 P, 572, 198 R, 198 E
See application file for complete search history.

(56) References Cited

U.S. PATENT DOCUMENTS

| 5,501,202 A | * | 3/1996 | Watanabe ................... 123/572 |
| 5,697,335 A | * | 12/1997 | Kimura et al. ......... 123/184.21 |
| 5,938,491 A | * | 8/1999 | Kawai et al. .................. 440/77 |
| 6,346,018 B1 | * | 2/2002 | Watanabe .................... 440/77 |
| 6,460,330 B1 | * | 10/2002 | Yoshida et al. ................ 60/300 |
| 6,579,135 B2 | * | 6/2003 | Nemoto et al. ................ 440/76 |
| 2003/0008573 A1 | * | 1/2003 | Katayama .................... 440/84 |
| 2003/0186600 A1 | * | 10/2003 | Ozawa ..................... 440/61 S |

FOREIGN PATENT DOCUMENTS

| JP | 10-153151 A | 6/1998 |
| JP | 11-11392 A | 1/1999 |

* cited by examiner

*Primary Examiner*—Stephen K. Cronin
*Assistant Examiner*—Keith Coleman
(74) *Attorney, Agent, or Firm*—Westerman, Hattori, Daniels & Adrian, LLP.

(57) ABSTRACT

An outboard engine unit having heat-generating electrical equipment. An intake port of an intake silencer is set at a distance from an engine, and air suctioned from the intake port is unlikely to be affected by heat produced by the engine. Electrical equipment is disposed in a direction of opening of the intake port, and air around the electrical equipment thereby circulates when air is suctioned from the intake port.

8 Claims, 17 Drawing Sheets

OUTBOARD ENGINE UNIT

FIELD OF THE INVENTION

The present invention relates to an outboard engine unit designed to efficiently cool heat-generating electrical equipment and generator used in the outboard engine unit.

BACKGROUND OF THE INVENTION

An outboard engine unit in which electrical equipment is disposed inside the engine cover that covers the engine and which is designed to cool the electrical equipment is disclosed in JP-A-10-153151 and JP-A-11-011392.

The electrical equipment disclosed in JP-A-10-153151 is disposed inside an intake duct through which outside air suctioned from the exterior of the outboard engine unit is brought to a throttle valve. For this reason, the structure and arrangement of the intake duct is limited, the arrangement structure of the electrical equipment is made more complicated, and manufacturing, including assembly, is therefore made more difficult.

With the outboard engine unit disclosed in JP-A-11-011392, two electrical equipment units arranged above and below are disposed on the front side of the engine, and intake silencers are disposed so as to be aligned in front of the electrical equipment units. The two electrical equipment units and intake silencers are thus disposed adjacent to each other in front and behind, making it is difficult to secure sufficient space, reducing space efficiency, and leaving room for improvement.

In view of the above, electrical equipment must be more efficiently disposed inside an engine cover to prevent the electrical equipment from being affected by heat.

SUMMARY OF THE INVENTION

According to an aspect of the present invention, there is provided an outboard engine unit comprising: an engine; an engine cover constituting a portion of an engine space for accommodating the engine therein; a box-shaped air intake silencer disposed forwardly of the engine and having an intake port formed on a surface other than those facing the engine; and electrical equipment disposed in a direction of opening of the intake port.

With this arrangement, the intake port of the intake silencer is isolated from the engine, the air that is suctioned from the intake port is therefore unlikely to be affected by heat produced by the engine, and an increase in the intake temperature can be reduced. Since the electrical equipment is disposed in the aperture direction of the intake port, air circulates about the electrical equipment, and the electrical equipment can be cooled with good efficiency without stagnation.

Preferably, the outboard engine unit further comprises a guide channel for guiding outside air from a vicinity of an outside air intake port formed on the engine cover toward the intake port of the intake silencer. With this arrangement, the ratio in which hot air is directly suctioned from the engine side wall can be reduced because outside air is suctioned from the outside air guide channel to the intake silencer, even in a configuration in which hot air around the electrical equipment is suctioned from the intake port.

Desirably, the outboard engine unit further comprises: hydraulic pressure devices for effecting pivotal movement of the engine unit about a tilt shaft; and an electric motor for driving the hydraulic pressure devices, wherein the electrical equipment is designed to drive-control the electric motor. In this arrangement, when the heat-generating electrical equipment is a relay for a tilt and trim motor, the electrical equipment can be disposed in the lower half of the engine room in locations other than the outside air guide channel.

Preferably, the engine includes an engine block that accommodates a substantially vertically disposed crankshaft, and the engine unit comprises wall means disposed between a rotary member of a power generator located in an upper portion of the crankshaft and the intake port of the intake silencer. In this arrangement, hot air that has passed through the power generator is made less likely to flow directly to the intake port by the wall means. Thus, the amount of air that is suctioned through the power generator is reduced in relation to the amount of air that is suctioned directly from the outside air intake port. Specifically, the expelled air (warm air) after having cooled the power generator is restricted from being suctioned into the engine, the effect of power generator cooling on the temperature of air taken into the engine is thereby reduced, and the engine output can be prevented from being affected by the suctioning of the expelled air from the power generator can be prevented.

In a preferred form, the power generator is disposed between the outside air intake port formed on the engine cover and the intake port of the intake silencer.

The wall means may comprise a wall surface of the intake silencer which is formed in a wall surface other than the wall surface in which the intake port is formed. In this manner, the wall means is composed of a wall surface of a portion of the intake silencer, and there is no particular need to provide the interior of the engine cover with a shielding member whereby warm air that has cooled the power generator would be prevented from being suctioned into the intake port. Such a configuration is advantageous in that the number of components can be reduced. Direct flow to the intake port can be limited by the shape of the intake silencer, a wall effect that reduces the effect on the intake temperature can be obtained, and the structure is simple. Therefore, higher costs can be avoided.

Preferably, a portion of the intake silencer is disposed between the rotary member of the power generator and the upper surface of the engine block; and the intake port is formed in an area other than the interposed portion of the intake silencer. In this arrangement, air that is expelled after having cooled the power generator is prevented by the interposed portion of the intake silencer from circumventing the wall, and the role of the wall can be reliably achieved using a simple structure.

Preferably, the engine block has a stepped portion formed by notching in the side portion of the top portion of the engine block; the power generator be disposed above the engine block that includes the stepped portion; and a protruding portion formed in a part of the intake silencer so as to protrude rearward is disposed between the stepped portion and the rotary member of the power generator. The expelled air that has passed by the power generator can therefore be prevented from being suctioned directly into the intake port after having passed around the engine block and other areas.

It is desirable that a portion of the power generator cover for covering the rotary member of the power generator be positioned above the top surface of the protruding portion and above the top surface of the intake silencer other than the protruding portion. For this reason, the expelled air after having cooled the power generator passes through a gap formed by a portion of the cover, the upper surface of the intake silencer, and the like, and is not suctioned directly into the intake port.

A cooling air guide channel may be provided to the peripheral wall portion of the power generator disposed between the intake port of the intake silencer and the outside air intake port formed in the engine cover, while the exit of the cooling air guide channel faces a side of the main body block of the engine on which the electrical box is not disposed. In this arrangement, the expelled air (warm air) that has passed by the power generator is unlikely to flow to the electrical box side, and the effect of heat on the electrical box caused by the expelled air can be reduced.

It is preferable that an outside air guide channel be formed between the intake port of the intake silencer and the outside air intake port formed in the engine cover; and a cooling air guide channel for cooling the power generator disposed in the upper portion of the crankshaft of the engine be provided to a location other than the outside air guide channel. For this reason, outside air is also introduced to the power generator by way of the power generator cooling air channel, and the cooling characteristics of the power generator are improved. The outside air is furthermore efficiently brought to the intake side by way of the outside air guide channel.

It is also preferable that the power generator cover for covering the power generator have a plurality of air introduction ports for taking in cooling air from the outside air guide channel into the power generator cover.

It is desirable that the power generator cover have a duct portion formed in the peripheral wall portion thereof and designed to exhaust cooling air introduced into the power generator cover.

Desirably, the camshaft drive mechanism disposed in an upper part of the engine is covered by a sealed cover, while the power generator is disposed above the sealed cover. The sealed cover prevents lubricating oil from entering into the power generator.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
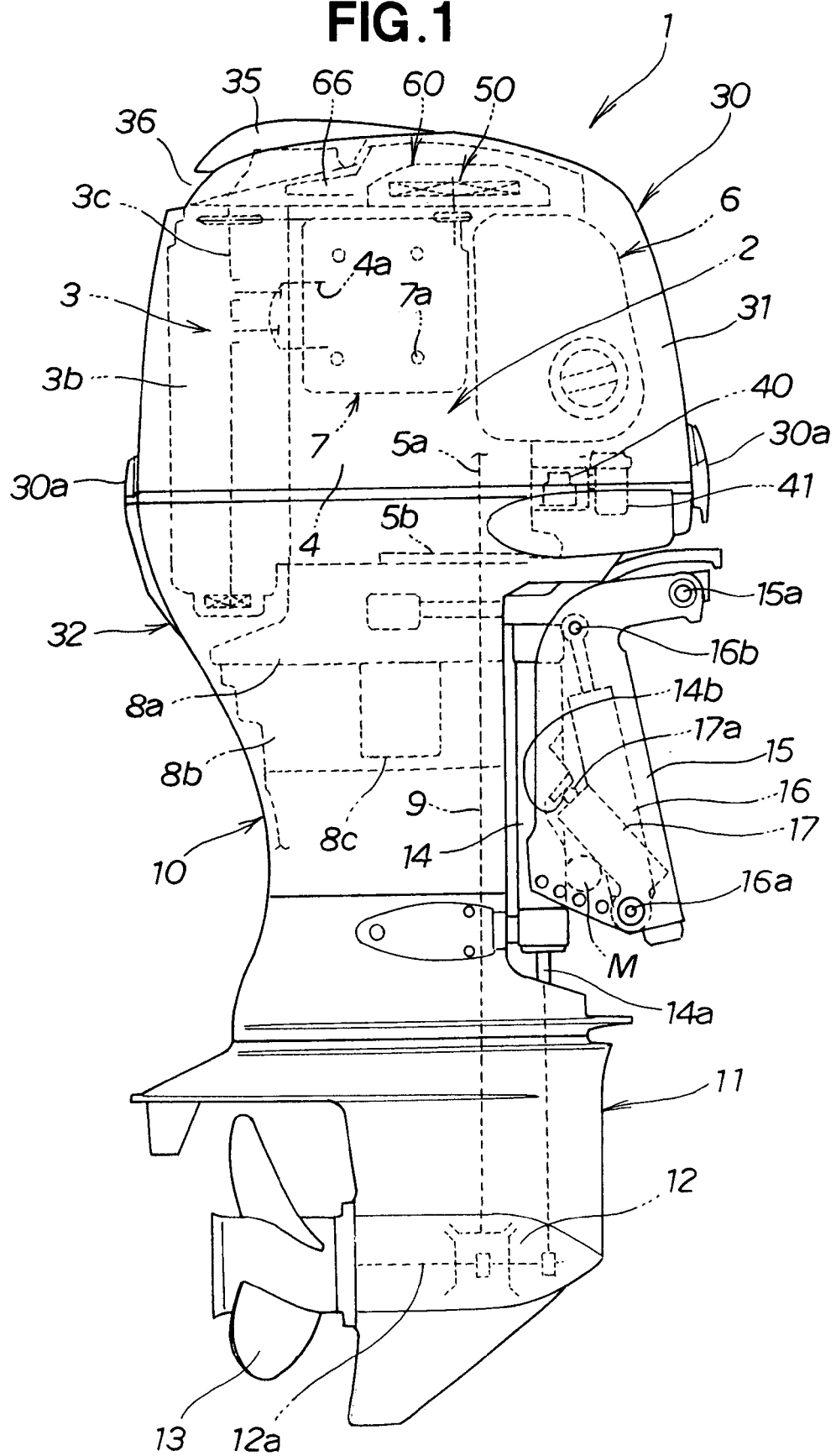
FIG. 1 is a side elevational view of the outboard engine unit according to the present invention.
Figure 2:
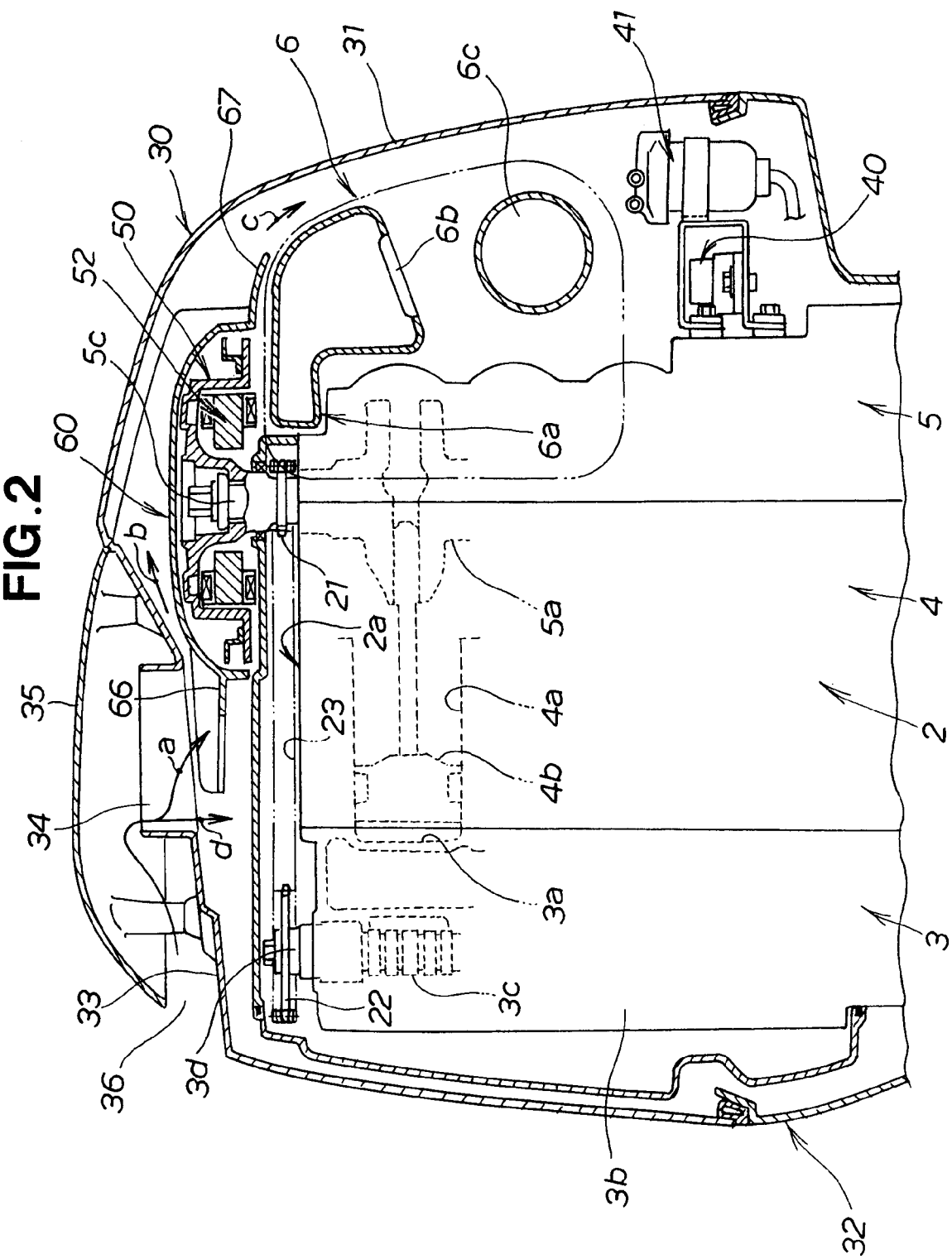
FIG. 2 is a cross-sectional view of the upper portion of the outboard engine unit shown in FIG. 1.

As shown in FIGS. 1 and 2, an outboard engine unit 1 has an engine 2 covered by an engine cover 30.

The engine 2 is a multi-cylinder four-stroke engine provided with substantially horizontally moving pistons and a vertically disposed crankshaft. The engine 2 is provided with a cylinder block 4, a cylinder head 3 disposed in the rear portion of the cylinder block 4, and a crankcase 5 disposed in the front portion of the cylinder block 4. The cylinder head 3 has a plurality of combustion chambers 3a and is covered by a cylinder head cover 3b. The cylinder block 4 has a plurality of cylinders 4a and a plurality of pistons 4b corresponding to the cylinders 4a. The crankcase 5 houses a vertically disposed crankshaft 5a. The engine block is composed of the cylinder block 4 and the crankcase 5.

An intake silencer 6 is disposed from the front portion of the right side of the crankcase 5 across the forward portion, and has an intake port 6b. A wall means is disposed in the wall surface of a portion of the intake silencer 6 so as to prevent air that has cooled a later-described power generator from flowing directly into the intake port 6b.

An electrical box 7 is fixed to the right side surface of the cylinder block 4 that constitutes the engine 2 by using a plurality of bolts 7a. The electrical box 7 accommodates electronic control devices and other electrical equipment boards that control engine ignition and fuel injection devices.

Figure 7:
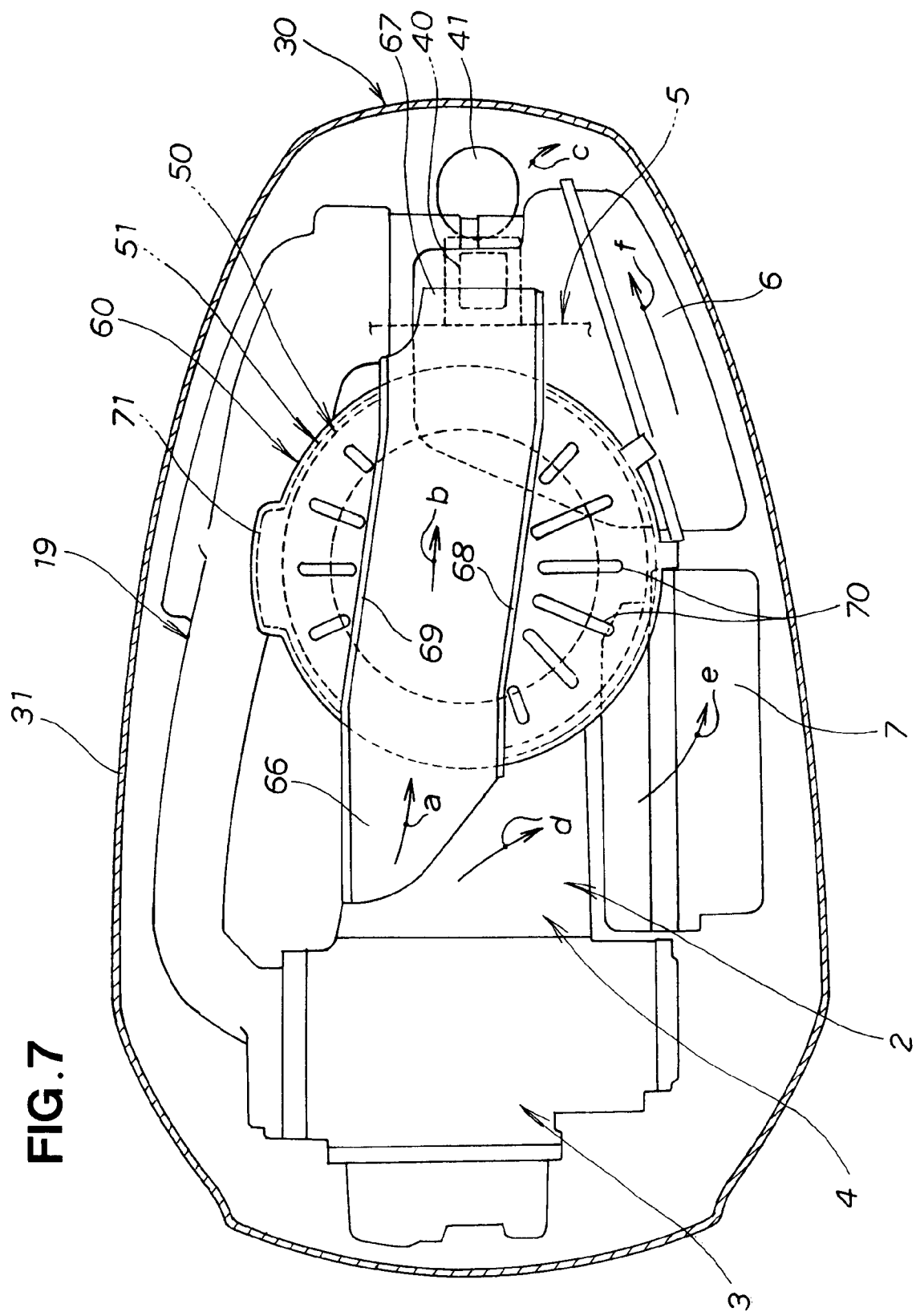
FIG. 7 is a view of a cross section of the top cover in the outboard engine unit shown in FIG. 6.

The intake silencer 6 and electrical box 7 are longitudinally arranged in relation to the right side surface of the crankcase 5 and cylinder block 4, as shown in FIG. 7.

The engine 2 is covered by the engine cover 30. The engine cover 30 is composed of a top cover 31 that covers the upper portion of the engine 2, and a bottom cover 32 that covers the lower portion of the engine 2. An engine room is formed by the top and bottom covers 31 and 32. The top cover 31 can be opened and closed in relation to the bottom cover 32 by operating lock levers 30a and 30a disposed in front and behind the outboard engine unit so that the engine 2 can be maintained and repaired.

The engine 2 is supported by a mounting case 8a. An oil case 8b that accommodates an oil pan 8c is joined to the lower surface of the mounting case 8a.

The vertically disposed crankshaft 5a is provided with a flywheel 5b at the lower end of the crankshaft and is connected to a downwardly suspended drive shaft 9. The drive shaft 9 passes through the inside of an extension case 10 that extends downward from the bottom cover 32, and is connected to a gear transmission mechanism 12 inside a gear case 11 that is mounted on the lower end of the extension case 10.

The gear transmission mechanism 12 transmits the drive force of the drive shaft 9 to a horizontal drive shaft 12a. The rear end portion of the horizontal drive shaft 12a protrudes rearward from the gear case 11. A propeller 13 is mounted on the rear end portion of the horizontal drive shaft 12a. The propeller 13 is driven by the motive force of the engine 2. The outboard engine unit 1 produces forward or rearward propulsion by switching the direction of the propeller 13 with the aid of a pair of dog clutches.

A swivel case 14 is disposed between the front portion of the mounting case 8a and the front lower portion of the extension case 10. The outboard engine unit 1 is rotatably supported in the parallel direction about a swivel shaft 14a inside the swivel case 14. The outboard engine unit 1 is mounted on the stern of a boat by way of a stern bracket 15, and can vertically pivot about a tilt shaft 15a.

The base end of a tilt cylinder 16 is rotatably mounted on the stern bracket 15 by way of a shaft 16a, and the distal end is rotatably mounted on the side of the swivel case 14 by way of a shaft 16b.

The base end of a trim cylinder 17 is rotatably mounted on the stern bracket 15. The distal end of a rod 17a of the trim cylinder 17 is disposed in contact with a cradle part 14b formed in the swivel case 14.

A boat is operated to achieve the desired trim from the start of gliding until normal cruising speed is reached by using the trim cylinder 17. When not in use, the outboard engine unit 1 is lifted upward by the tilt cylinder 16.

A trim and tilt device has a hydraulic pressure device composed of the tilt cylinder 16 and the trim cylinder 17, and an electric motor M that drives the hydraulic device. The electric motor is driven and controlled by the electrical equipment.

Figure 3:
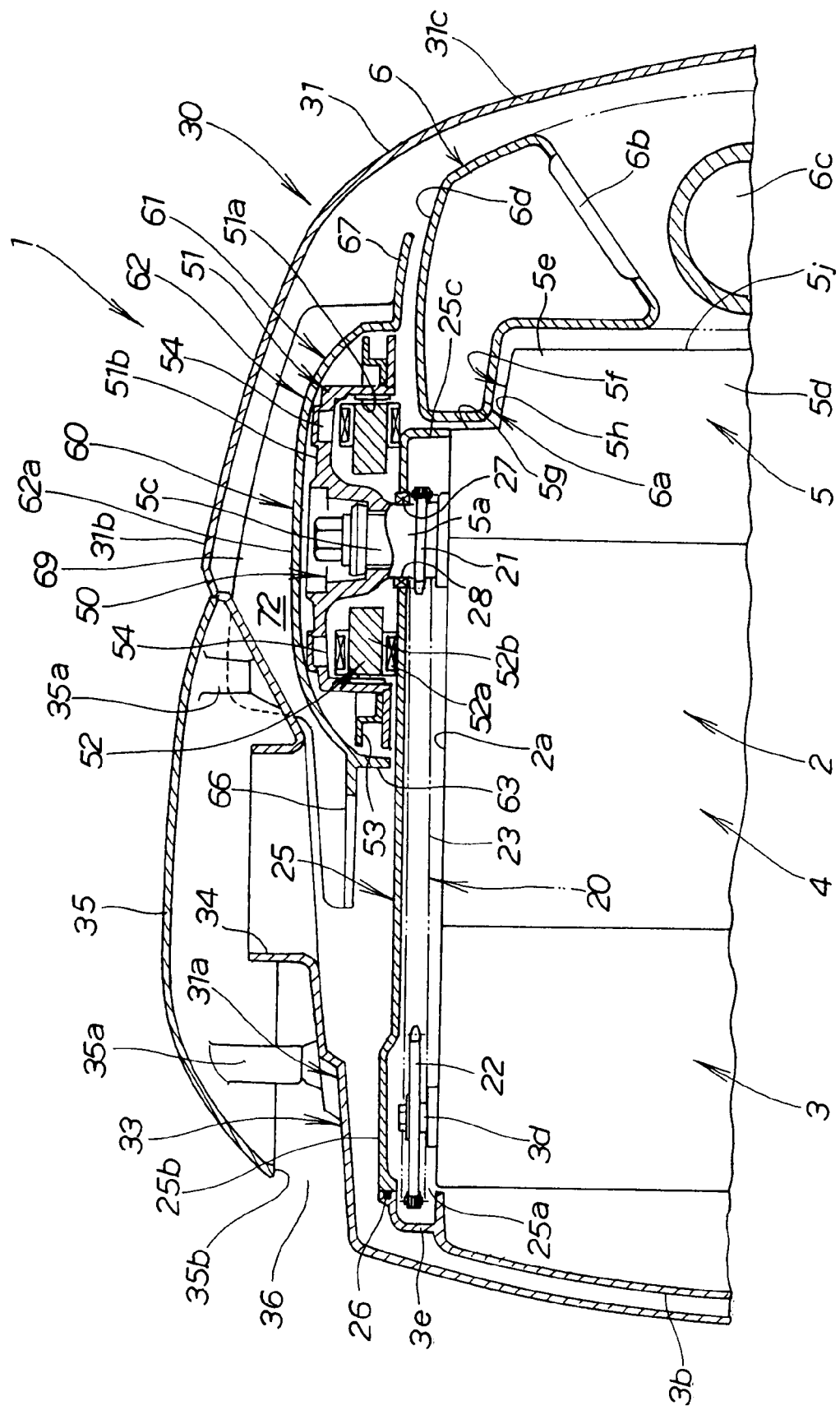
FIG. 3 is a cross-sectional view showing the relationship between the top cover, the power generator, and the intake silencer inside the upper portion of the outboard engine unit shown in FIG. 2.
Figure 9:
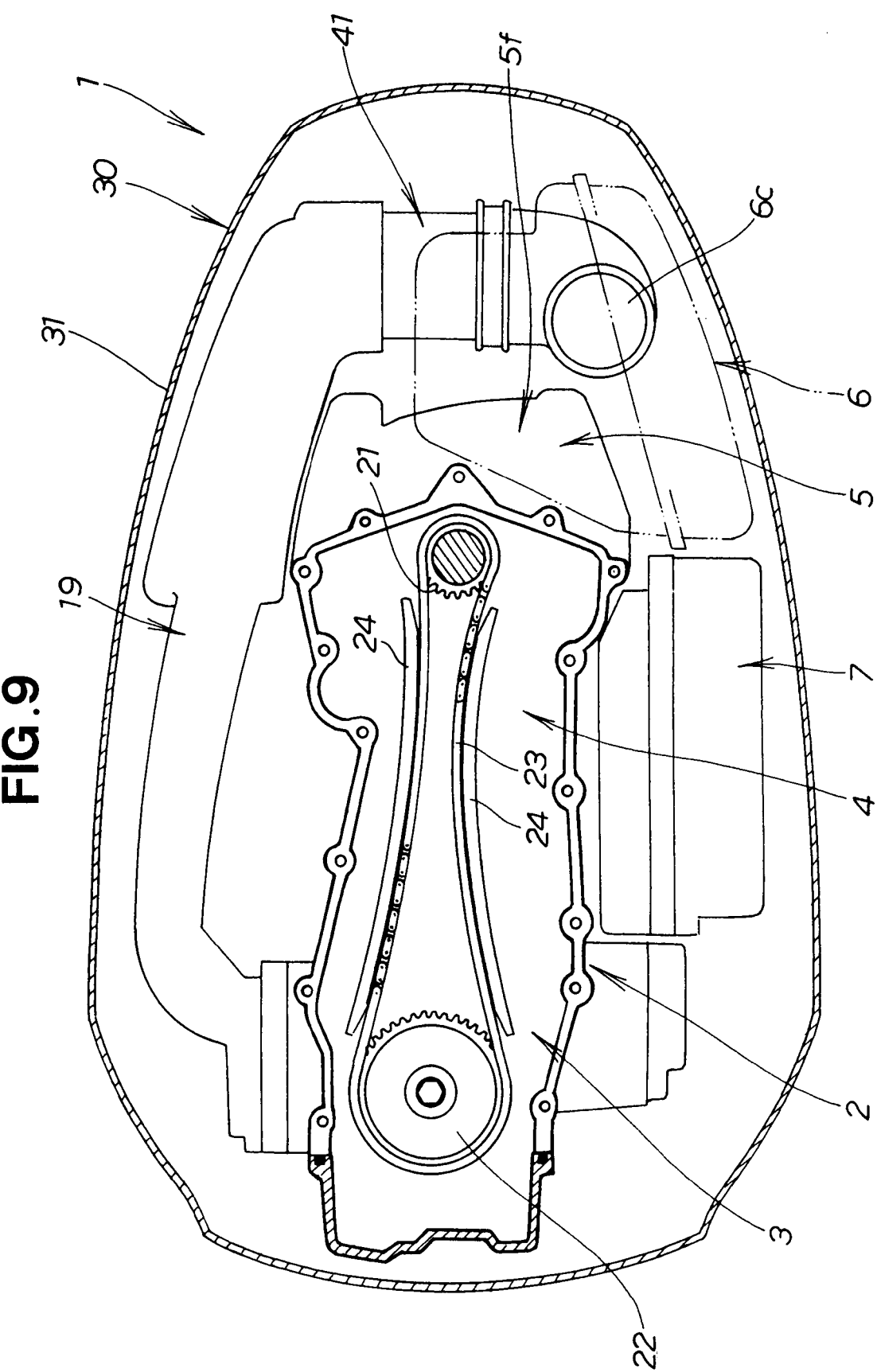
FIG. 9 is a view showing the camshaft drive mechanism in the outboard engine unit shown in FIG. 8.
Figure 10:
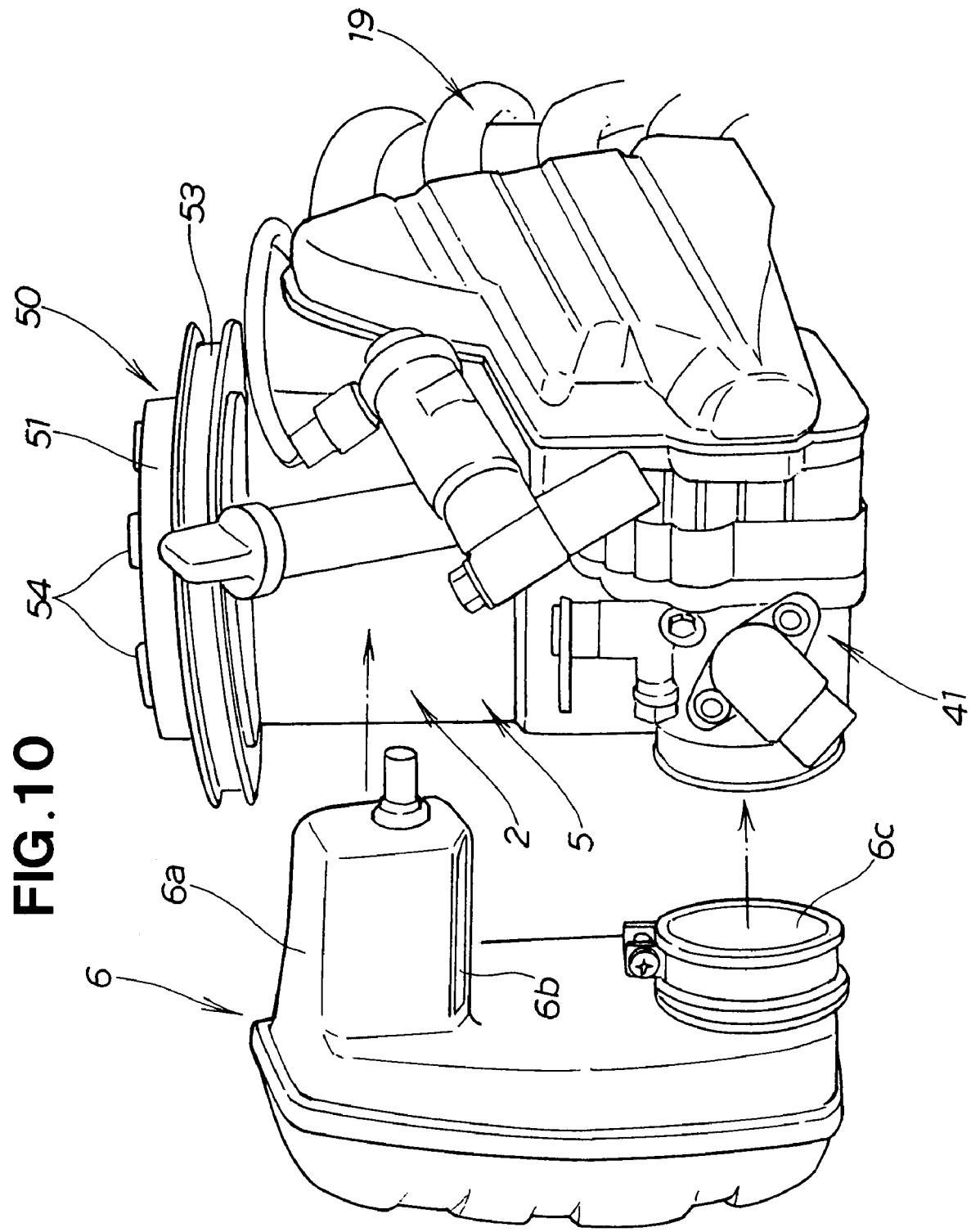
FIG. 10 is a perspective view of the intake silencers, throttle valve device, and inlet manifold shown in FIG. 4.

The crankshaft 5a has an upper portion 5c that protrudes above the boundary between the cylinder block 4 and crankcase 5, as shown in FIGS. 2 and 3. A drive sprocket 21 is mounted below the upper protruding portion 5c. A driven sprocket 22 is mounted on an upper end portion 3d of a camshaft 3c that is longitudinally disposed inside the cylinder head 3. The upper end portion 3d protrudes upward from the top surface 2a of the engine block. A chain 23 is wound around the driving and driven sprockets 21 and 22. Guides 24 and 24 (FIG. 9) are disposed on both sides of the chain 23 so that the chain 23 does not become loose.

A camshaft drive mechanism 20 that drives the camshaft 3c is composed of the drive sprocket 21, driven sprocket 22, chain 23, and guides 24 and 24.

The upper portion 5e of the front half portion 5d of the crankcase 5 has a stepped portion 5f notched in the form of the letter 'L.' The stepped portion 5f is formed by a vertical wall portion 5g and a substantially horizontal lateral wall portion 5h. A front wall portion 5j of the crankcase 5 continues downward from the front end of the lateral wall portion 5h.

Since the camshaft drive mechanism 20 requires lubricating oil, there is a possibility that the lubricating oil will be scattered in the surrounding area. For this reason, the area surrounding the camshaft drive mechanism 20 is covered by a first cover 25 above the upper surface 2a of the engine 2. An aperture 25a is located at the rear end of the first cover 25 where the driven sprocket 22 is positioned. The aperture 25a is covered from behind by a portion 3e that has a U-shaped in cross section and is formed in the upper portion of the cylinder head cover 3b. The contact area between the U-shaped portion 3e and the first cover 25 is sealed using an O-ring 26.

The rear portion 25b of the first cover 25 accommodates the driven sprocket 22, and is therefore formed so as to be higher than other areas of the first cover 25. The area around the first cover 25 excluding the aperture 25a is a peripheral wall 25c having a prescribed height in order to surround the area around the camshaft drive mechanism 20. An aperture 27 is formed in the front portion of the first cover 25 to allow the upper portion 5c of the crankshaft 5a to protrude upward. The area between the upper portion 5c of the crankshaft 5a and the aperture 27 is sealed by an oil seal 28.

The front lower end of the peripheral wall 25c of the first cover 25 is flush against the vertical wall portion 5g that forms the stepped portion 5f of the crankcase 5, and seals in the camshaft drive mechanism 20.

An AC power generator (ACG) 50 that generates power from the rotational driving of the crankshaft 5a is mounted on the upper portion 5c of the crankshaft 5a. The power generator 50 is provided with an inverse cup-shaped rotary member 51 having a magnet 51a fixed to the inner peripheral surface thereof, and a magneto coil 52 in which a coil 52a is wound about an iron core 52b.

A recoil starter flange 53 is fixed to the external periphery of the rotary member 51. The recoil starter flange 53 extends radially outward so as to be positioned above the stepped portion 5f of the crankcase 5.

Figure 8:
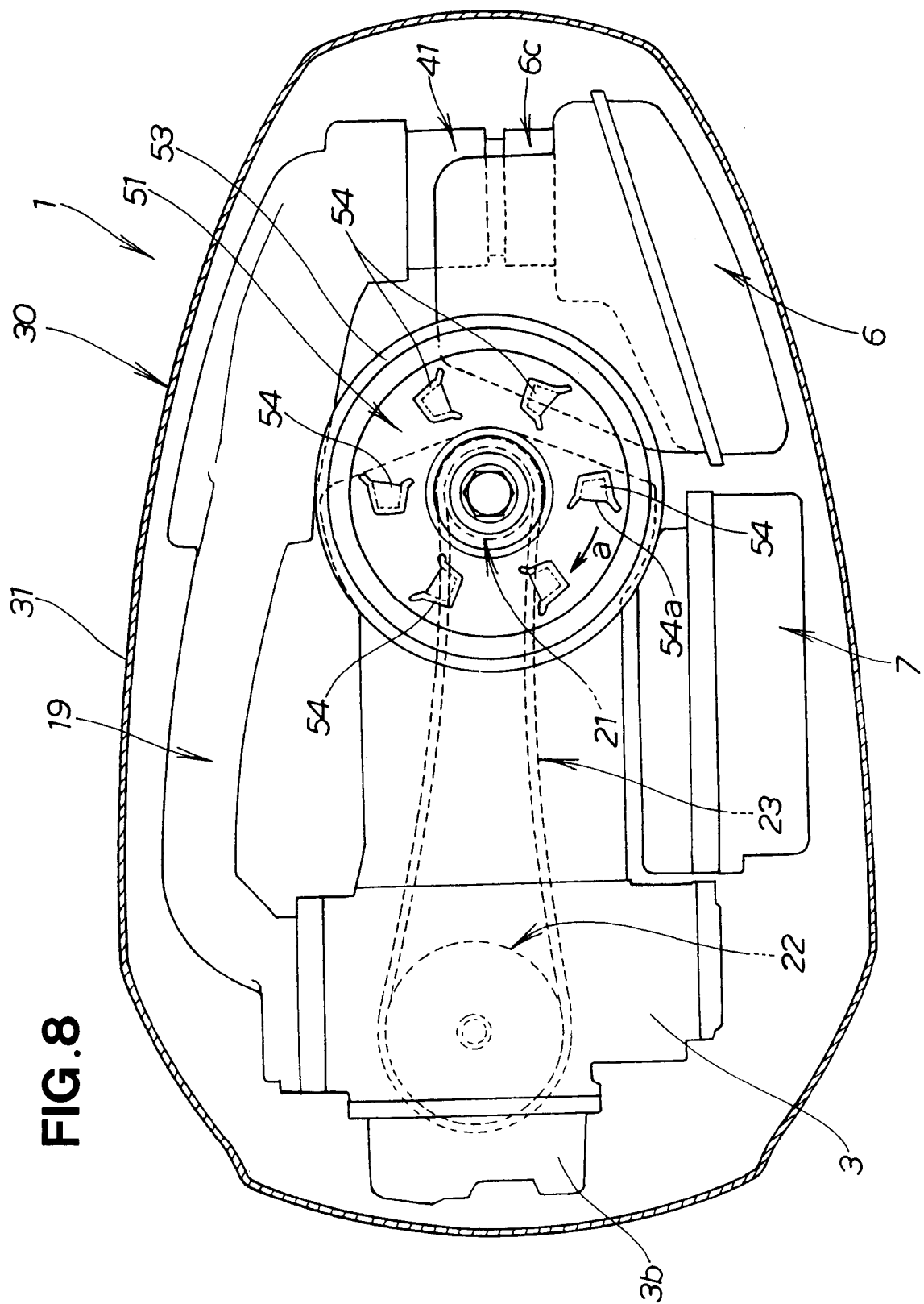
FIG. 8 is a view of the state in which the power generator cover has been removed in the outboard engine unit shown in FIG. 7.

The rotary member 51 has a plurality of outside air introduction portions 54 radially formed in the ceiling 51b in order to take outside air into the rotary member (see FIG. 8). Each of the outside air introduction portions 54 has an aperture that faces the rotational direction of the rotary member 51, and the power generator 50 is cooled by the outside air introduced from the apertures into the rotary member 51.

The top cover 31 of the engine cover 30 has a concavity 33 formed in the rear half upper surface 31a, and an outside air intake port 34 formed in the center area of the front and rear directions of the concavity 33 so as to open upward. The front half upper surface 31b of the top cover 31 bulges upward, gradually slopes downward toward the front, and is connected to the front wall portion 31c of the top cover 31.

A lid 35 is disposed on the outside air intake port 34 formed in the rear half portion of the top surface 31a of the top cover 31. The lid is supported on the rear half portion of the top surface 31a by a plurality of legs 35a. The area between the rear end portion 35b of the lead 35 and the rear half portion of the top surface 31a of the top cover 31 is open in order to take outside air into the engine cover 30. Outside air is introduced from an aperture 36 into the engine cover 30 by way of the outside air intake port 34.

A throttle valve device 18 that constitutes a fuel supply device is disposed between the intake silencer 6 and an inlet manifold 19, as shown in FIGS. 2 to 5.

The intake silencer 6 has a protruding portion 6a that protrudes in the rearward direction of the outboard engine unit 1. The protruding portion 6a is positioned below the front portion of the power generator 50, in a space formed between the stepped portion 5f formed in the crankcase 5 and the recoil starter flange 53 of the rotary member 51 positioned above the stepped portion 5f. Specifically, the protruding portion 6a is composed of wall means disposed between the crankcase 5 that constitutes a portion of the engine block and the rotary member 51 of the power generator 50, and the expelled air that has passed by the power generator 50 is unlikely to be suctioned directly from the intake port 6b formed in the later-described intake silencer 6.

The intake silencer 6 has an intake port 6b for introducing outside air into the engine cover 30. The intake port 6b is formed in a surface other than the surface that faces the engine 2, i.e., the crankcase 5. In the example shown in the diagram, the intake port 6b is formed facing downward. Furthermore, the intake silencer 6 has an exhaust port 6c formed in a position below the intake port 6b in order to discharge outside air introduced from the intake port 6b toward the throttle valve device 18. The exhaust port 6c is connected to the introduction portion of the throttle valve device 18 and is used to supply outside air to the throttle valve device 18.

The outside air flows into the engine cover 30 by way of the aperture 36 formed by the top cover 31 and lid 35, and by way of the outside air intake port 34 formed in the top cover 31, as shown in FIG. 2. The outside air that has passed through the outside air intake port 34 flows in above a rear extended portion 66 of the a second cover 60, which is a cover of the power generator 50, in the manner indicated by the arrow a; is then guided to the upper surface of the second cover 60 in the manner indicated by the arrow b; and ultimately flows to the area in front of the intake silencer 6 in the manner indicated by the arrow c. The outside air is then suctioned from the intake port 6b of the intake silencer 6 into the intake silencer 6, is introduced to the throttle valve device 18 shown in FIGS. 4 and 5, and is mixed with fuel and fed to the inlet manifold 19.

Outside air that has passed through the outside air intake port 34 flows above and to the side of the electrical box 7, as well as above and to the side of the intake silencer 6 in the manner indicated by the arrows d, e, and f, and flows around the engine 2, as shown in FIGS. 2 and 7.

The fuel/water separator 41 and electrical equipment 40 that controls the electric motor for driving the tilt cylinder 16 and the trim cylinder 17 shown in FIG. 1 are described next with reference to FIGS. 11 to 13.

Figure 4:
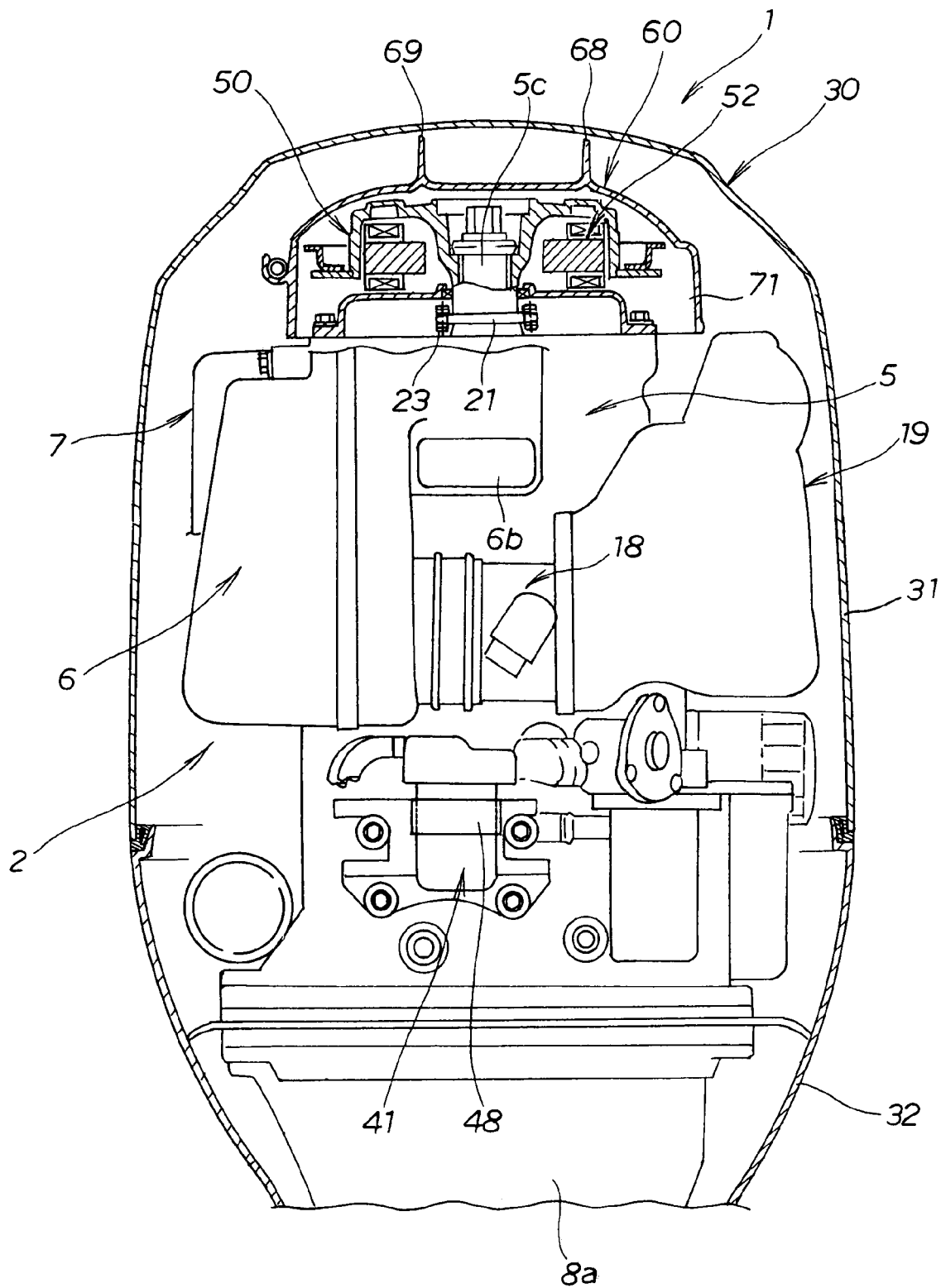
FIG. 4 is a partial cross-sectional view as seen from the front of the outboard engine unit shown in FIG. 2.

The electrical equipment 40 and water separator 41 are mounted on the front wall of the crankcase 5 so as to be positioned below the intake port 6b of the intake silencer 6, as shown in FIGS. 2 and 4.

The electrical equipment 40 includes a relay switch of the electric motor and a pump for reciprocally driving the hydraulic pressure devices composed of the tilt cylinder 16 and trim cylinder 17. The electrical equipment 40 is negatively affected by heat, an environment in which the temperature does not rapidly increase must be maintained, and the electrical equipment 40 must be made vibration proof.

The electrical equipment 40 and fuel/water separator 41 preferably share a support to form a single support structure, whereby the support structure is simplified, the number of components is reduced, and mounting labor is reduced.

Figure 11:
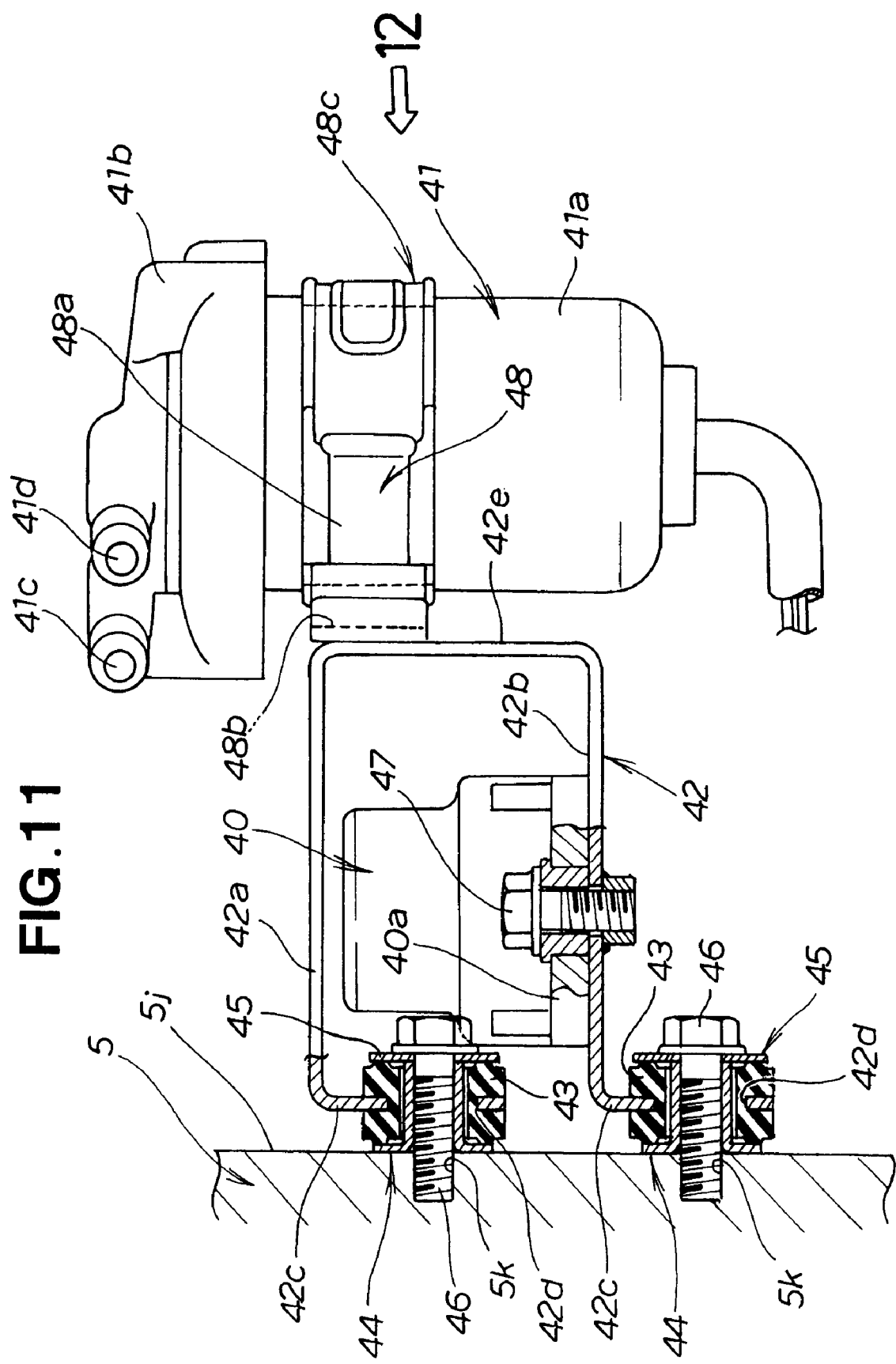
FIG. 11 is a detailed view showing the electrical equipment and water separator shown in FIG. 2.
Figure 12:
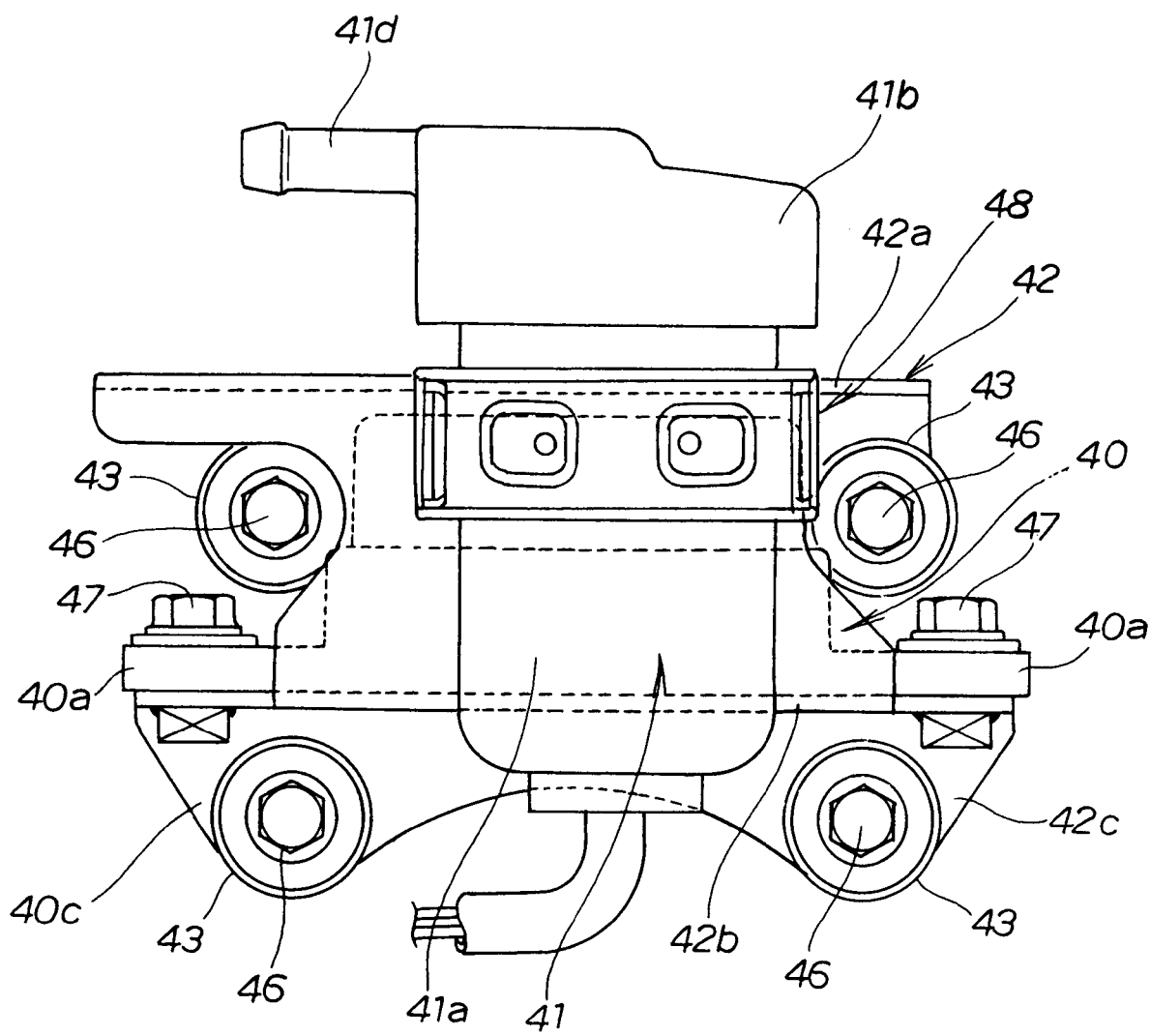
FIG. 12 is a front view as seen in the direction of arrow 12 in FIG. 11.

A bracket 42 that supports the electrical equipment 40 and fuel/water separator 41 is U-shaped as viewed from the side in which the left and right sides are open, as shown in FIGS. 11 and 12, and is fabricated by press molding a steel plate.

The two ends of both the upper wall portion 42a and lower wall portion 42b of the bracket 42 have four mounts 42c bent downward in order to mount the bracket on the front wall portion 5j of the crankcase 5.

The mounts 42c have mounting holes 42d in which vibration-proofing rubber grommets 43 are fitted. Bushings 44 are inserted through the grommets 43, and bolts 46 are inserted through washers 45 and threaded into screw holes 5k formed in the front wall portion 5j of the crankcase 5, whereby the bracket 42 is fixed to the front surface of the crankcase 5.

The electrical equipment 40 is mounted inside the bracket 42 by using bolts 47 to fix a mounting flange 40a that extends in the left and right directions below the electrical equipment to the top of the lower wall portion 42b.

The fuel/water separator 41 is mounted on the front wall portion 42e of the bracket 42 by way of an arm member 48. The arm member 48 is U-shaped as viewed in a plane in which the front, upper, and lower portions of the arm member are open.

The trunk portion 41a of the water separator 41 is held between the left and right side wall portions 48a and 48a of the arm member 48. Specifically, the rear surface and left and right side surfaces of the trunk portion 41a are enclosed by the left and right side wall portions 48a and 48a, as well as the rear wall portion 48b of the arm member 48. The front surface of the trunk portion 41a is restrained by a belt 48c that spans the area between the front end portions of the left and right side wall portions 48a and 48a of the arm member 48.

In this manner, the electrical equipment 40 is mounted on the crankcase 5 by way of the bracket 42, and the water separator 41 by way of the arm member 48 and bracket 42. The electrical equipment 40 and 41 are mounted on the side of the engine by way of rubber grommets 43, and are therefore made resistant to vibrations produced by the driving of the engine.

Figure 13:
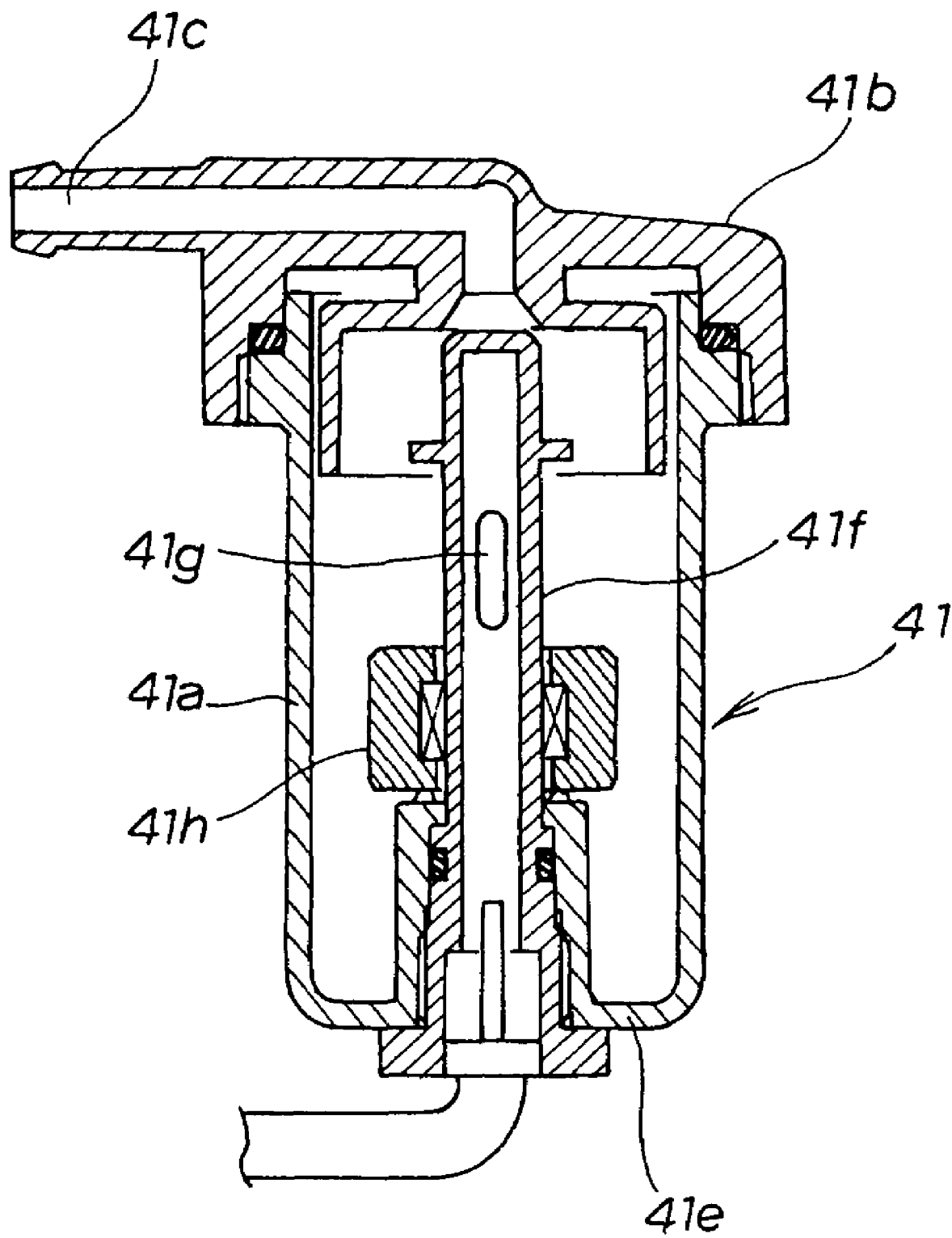
FIG. 13 is a cross-sectional view showing the water separator shown in FIG. 11.

The water separator 41 is composed of a trunk portion 41a and a cover 41b detachably threaded onto the top portion of the trunk portion 41a, as shown in FIG. 13. A fuel inlet 41c and a fuel outlet 41d are disposed side by side, as shown in FIG. 11. A reed switch holder 41f that houses a reed switch 41g is vertically inserted upward into the trunk portion 41a from the bottom portion 41e of the trunk portion 41a. A ring-shaped magnet float 41h is mounted about the periphery of the reed switch holder 41f.

Fuel is introduced from the fuel inlet 41c into the trunk portion 41a of the water separator 41 through the fuel outlet 41d. Water contained in the fuel is separated in this process.

The water thus separated is held inside the trunk portion 41a. The level of the water held in this manner is detected by the reed switch 41g when the magnet float 41h rises. The tubes from the fuel inlet 41c and fuel outlet 41d are detached when it is time for the separated water to be expelled as indicated by a lamp or other display means, the cover 41b is then detached from the trunk portion 41a, and the water held in the trunk portion 41a is expelled.

As described above, the electrical equipment is disposed below an intake port formed in the front lower surface of the intake silencer positioned on the front surface side of the outboard engine unit. Therefore, air below the intake port flows as well, and air in the area around the electrical equipment circulates while outside air is suctioned from the intake port of the intake silencer. Accordingly, the electrical equipment is cooled and the heat generated in the electrical components can be reduced.

Figure 14:
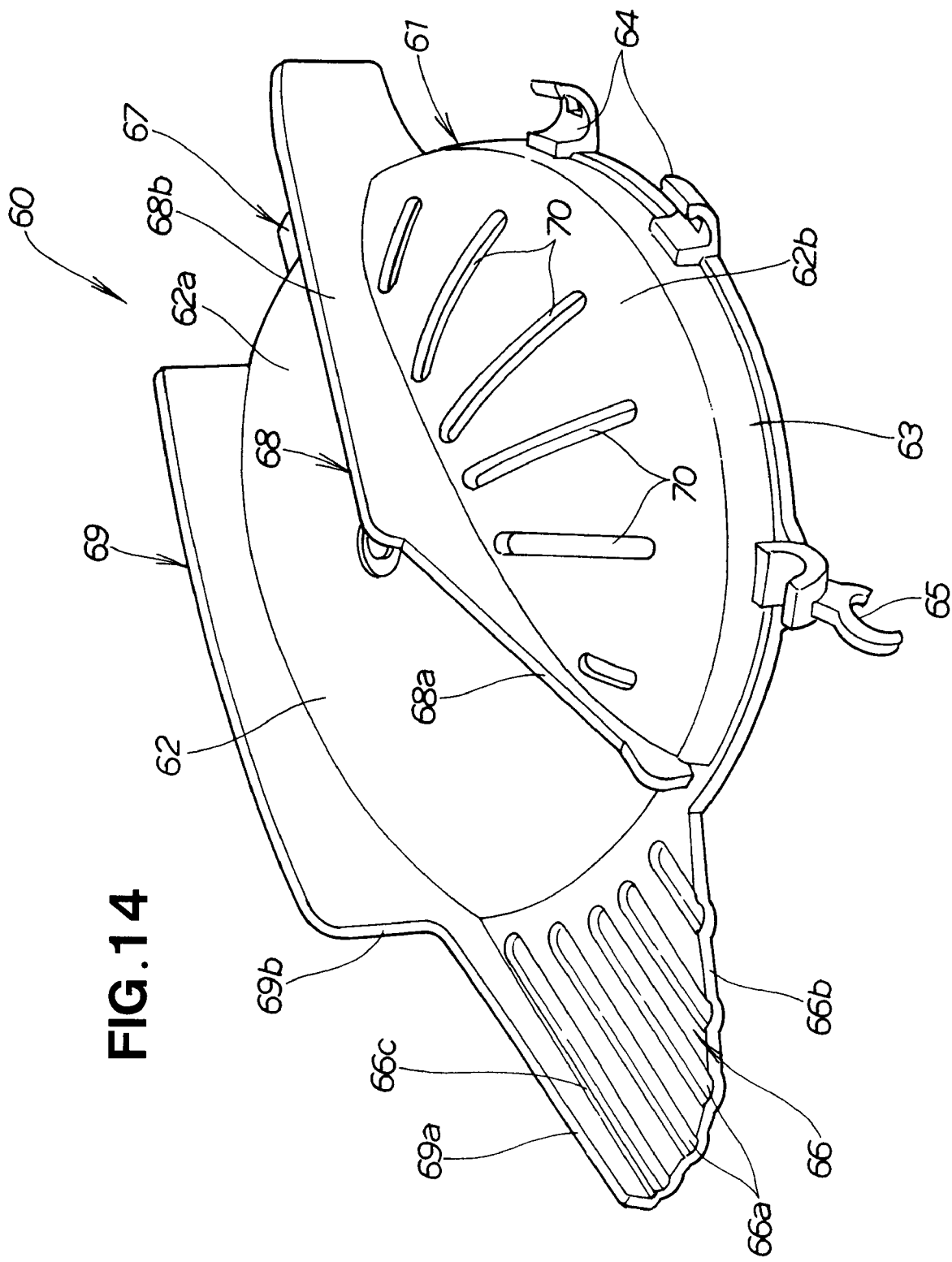
FIG. 14 is a detailed perspective view showing the power generator cover shown in FIG. 3.

The second cover 60, which is the power generator cover, is described next with reference to FIGS. 14, 15, and 16.

A function of the second cover 60 is to efficiently guide outside air taken into the engine cover 30 from the outside air intake port 34 formed in the top cover 31 and to protect the power generator 50, as shown in FIG. 2.

The second cover 60 is composed of a cover main body 61, a front extension (downstream side extension) 67 and a rear extension (upstream side extension) 66 formed in front and behind the cover main body 61, and first and second guide walls 68 and 69 that extend forward and rearward on the top surface of the cover main body 61 and are separated to the left and right while remaining parallel to each other.

The cover main body 61 has an upwardly curved dome-shaped ceiling portion 62, and a peripheral wall portion 63 suspended downward from the lower end peripheral portion of the ceiling portion 62. The two portions are integrated with each other. The peripheral wall portion 63 has a plurality of upwardly facing U-shaped stoppers 64 and a plurality of downwardly facing U-shaped stoppers 65 in the lower end peripheral part of the peripheral wall portion. The two groups of stoppers are integrally formed with each other. The upwardly facing stoppers 64 support a breather hose that passes completely through the cam chamber and the intake silencer. The second cover 60 is fixed to the engine block by using the downward-facing stoppers 65 and grommets 67a (FIG. 16) disposed in the front extension 67.

The rear extension 66 is a plate-shaped body having a substantially right-triangular configuration as view from above, and the plate-shaped body has undulating portions 66a.

The top surface of the cover main body 61 between the first guide wall 68 and the second guide wall 69 formed in the cover main body 61 is a guide surface 62a for guiding outside air. The guide surface 62a is continuous with the top surface of the rear extension 66.

The upstream extension 66 extends further than the downstream extension 67. The top surface of the downstream extension 67 is flat and is continuous with the guide surface 62a.

In this manner, the top surface of the upstream extension 66, the guide surface 62a of the ceiling portion 62, and the top surface of the downstream extension 67 constitute an outside air guide channel (outside air guide means) 72 (FIG. 3) for introducing outside air into the engine cover 30 (FIG. 3), as shown in FIG. 3.

The first guide wall 68 has a sloped edge 68a sloping upward from the boundary with the ceiling portion 62, which is the base end portion of a sloped edge 66b of the rear extension 66, and also has a wall front half portion 68b that slopes gradually downward in the forward direction from the end of the sloped edge 68a.

The second guide wall 69 has a low profile wall portion 69a curved upward from a linear edge 66c of the rear extension 66, and a high profile wall portion 69b in the forward direction that is continuous with the wall portion 69a and that stands erect from the boundary with the ceiling portion 62. The high profile wall portion 69b extends to one side of the front extension 67.

In this manner, the first and second guide walls 68 and 69 are asymmetrical in shape, but are disposed so as to be substantially parallel.

A plurality of long holes 70 extending radially from the center of the ceiling portion 62 is formed in the left and right top surfaces 62b and 62c with the exception of the guide surface 62a, which is on the top surface of the ceiling portion 62. The long holes are air introduction holes that introduce outside air into the cover main body 61.

Figure 15:
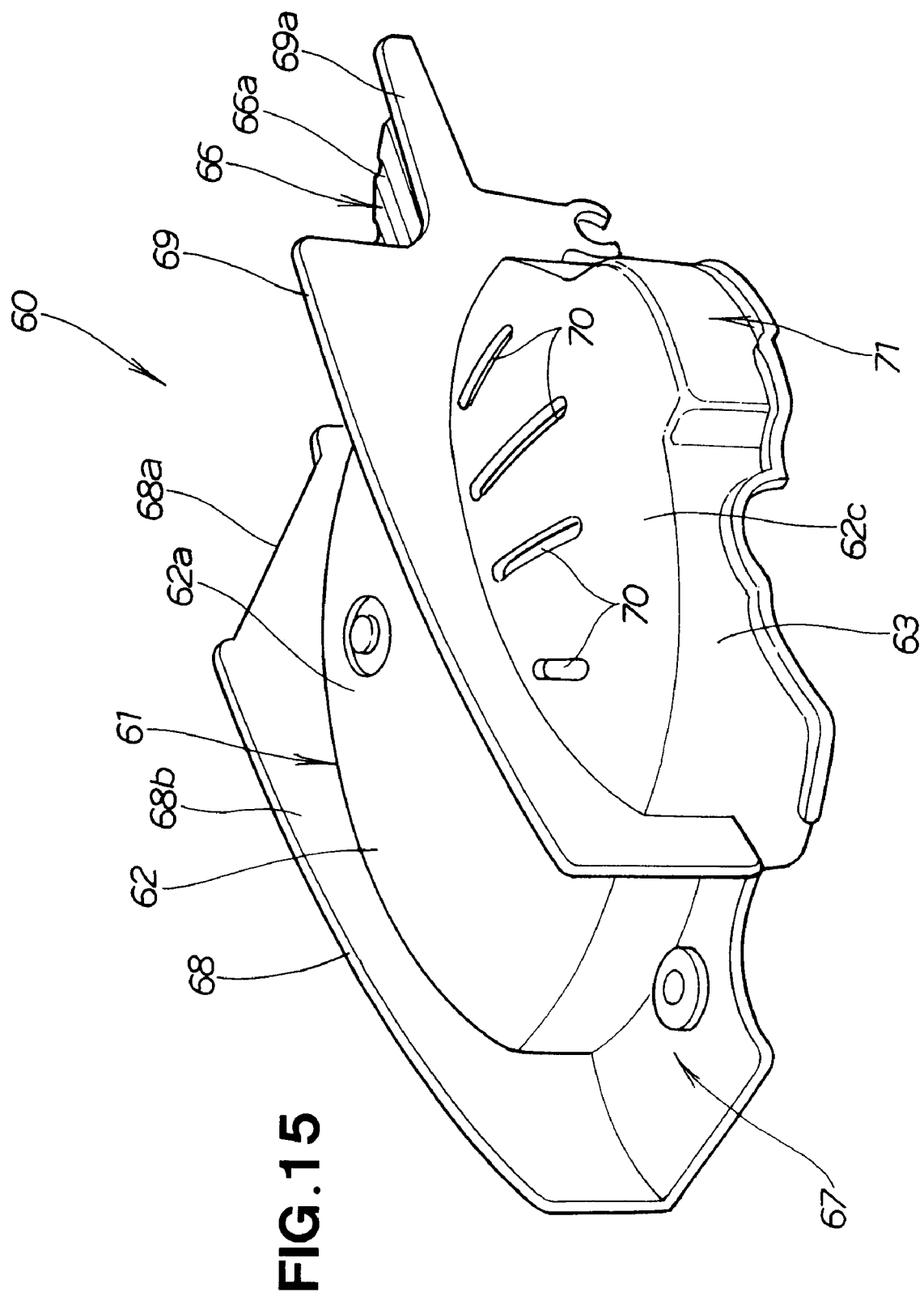
FIG. 15 is a perspective view as seen from the front of the power generator cover shown in FIG. 14.
Figure 16:
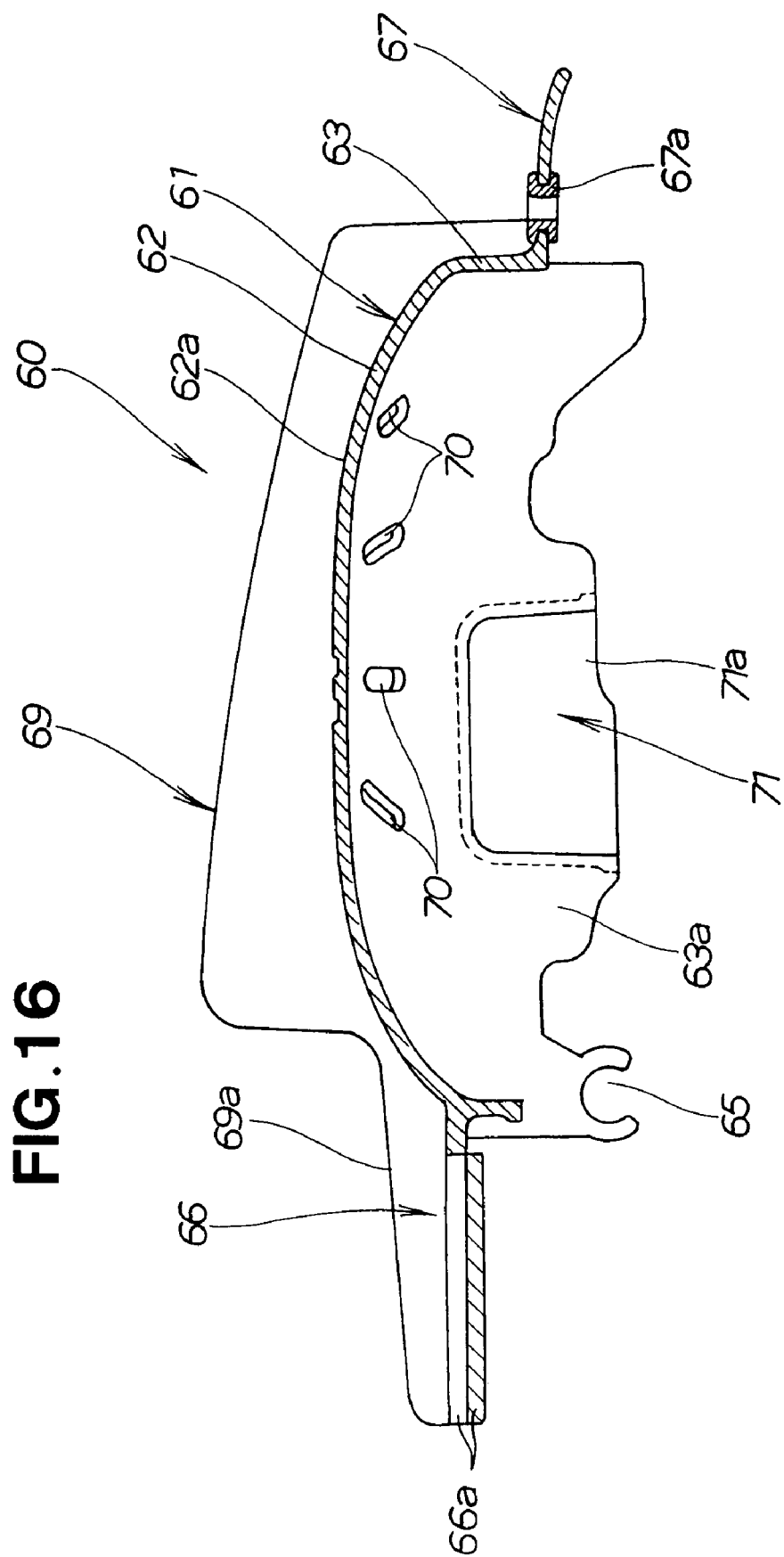
FIG. 16 is a cross-sectional view of the power generator cover shown in FIG. 14.

A duct portion 71 that bulges outward is disposed on the left side, which is one side of the peripheral wall portion 63 of the cover main body 61, as shown in FIG. 15. The duct portion 71 has an aperture 71a that is open in the downward direction, as shown in FIG. 16. Therefore, the duct portion 71 passes through the interior of the ceiling portion 62 of the cover main body 61 and opens into the engine room shown in FIG. 3.

Outside air taken into the engine cover 30 (FIG. 3) is admitted into the second cover 60 via a plurality of air introduction holes 70. The outside air is introduced into the power generator 50 from a plurality of outside air introduction portions 54 disposed in the top surface of the rotary member 51 of the power generator 50. The heated portions of the power generator 50 are cooled and the warm air is expelled from the duct portion 71 into the engine room.

Figure 5:
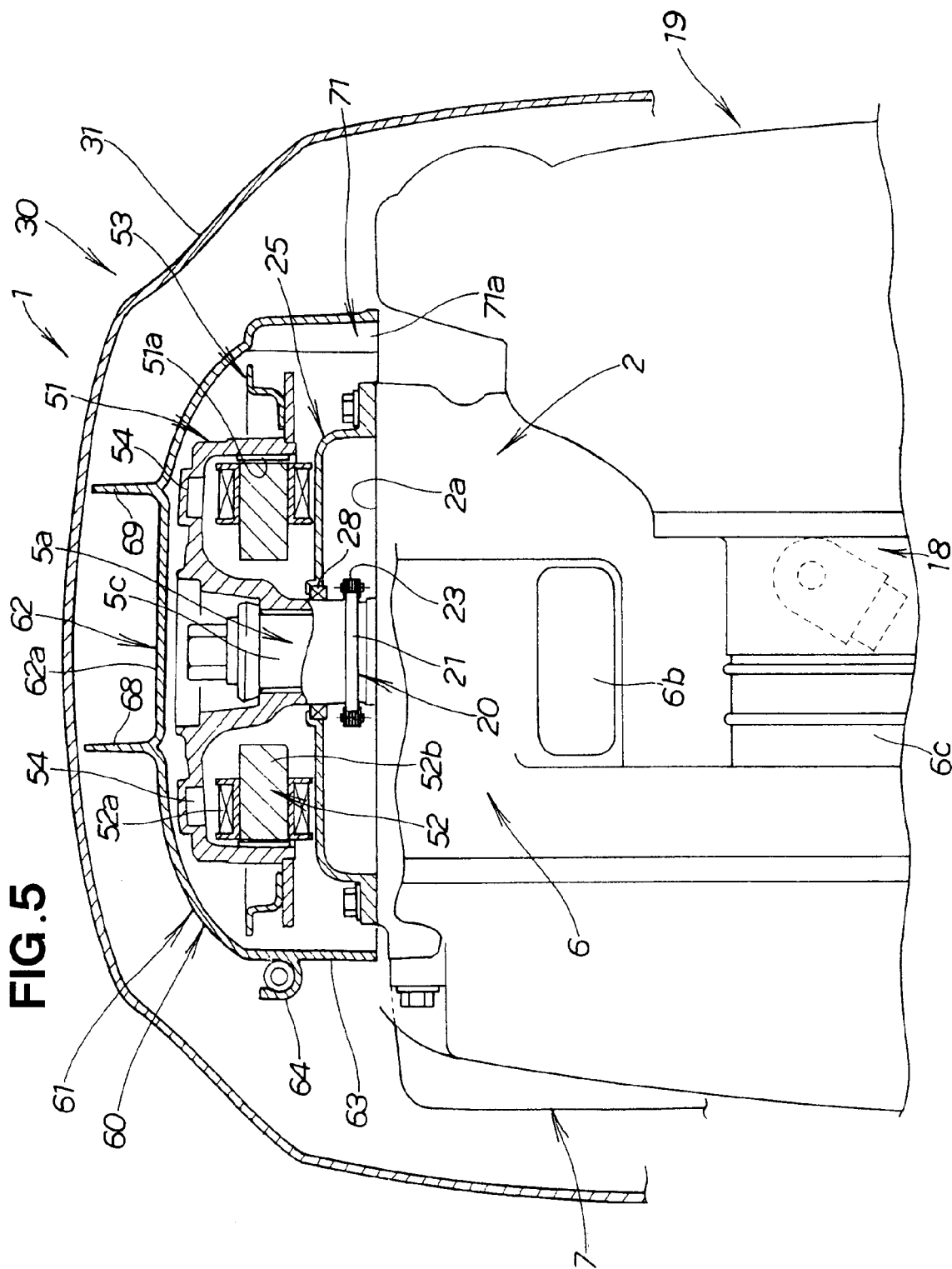
FIG. 5 is a cross-sectional view showing an enlarged view of the cross section shown in FIG. 2.
Figure 6:
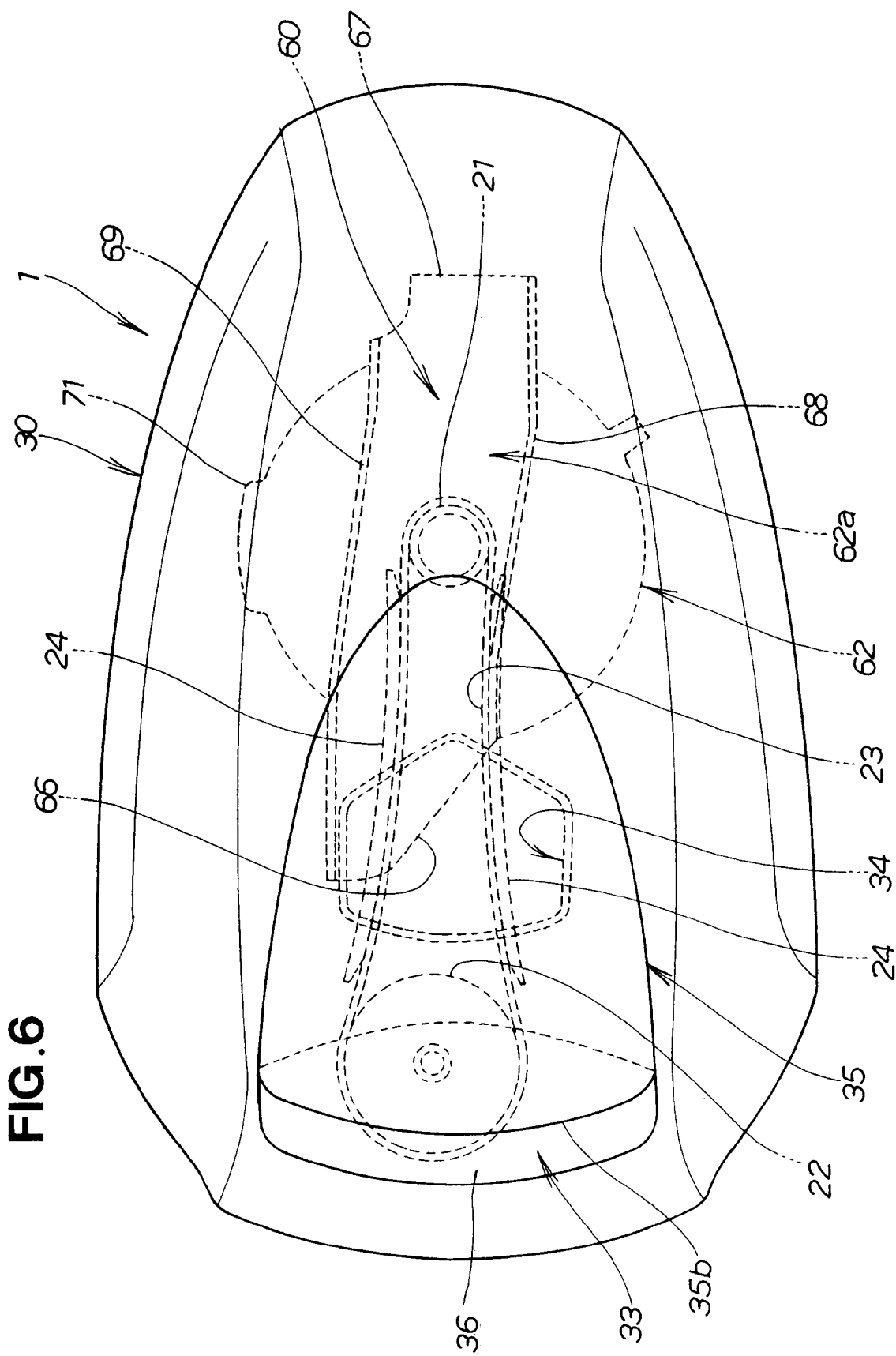
FIG. 6 is a plan view of the outboard engine unit shown in FIG. 1.

In this manner, the air introduced into the power generator cover 60 flows around the power generator 50 and cools the power generator 50. The expelled air, which has been warmed after cooling the power generator 50, is discharged downward through the exit, i.e., the aperture 71a of the duct portion 71, as shown in FIG. 5. The duct portion 71 is positioned on the opposite side of the electrical box 7, which is disposed on one side of the engine 2. The inlet manifold 19, which constitutes the intake channel of the engine, is disposed below the aperture 71a of the duct portion 71.

A small gap is formed between the bottom surface of the second cover 60, and the electrical box 7 and intake silencer 6 positioned in front of the electrical box is narrow, and the electrical box 7 and intake silencer 6 are only lightly affected by the expelled air following cooling of the power generator.

The second cover 60 is fixed to the engine block 4 to cover the power generator 50, as shown in FIGS. 3 and 5. A gap is formed between the cover main body 61 of the second cover 60 and the top cover 31 of the engine cover 30.

The front portion of the cover main body 61, which is the downstream side of the outside air guide channel 72, is positioned at a slight gap above the protruding portion 6a of the intake silencer 6, which is disposed on the stepped portion 5f formed in the front-half upper portion of the crankcase 5.

The front extension 67 of the second cover is positioned at a slight gap above the top surface 6d of the intake silencer 6, excluding the protruding portion 6a.

The power generator 50 is cooled by the outside air (cooling air) introduced into the second cover 60, and the warm air after cooling the power generator 50 is expelled from the aperture 71a of the duct portion 71. Therefore, the warm air after cooling is expelled to the opposite side of the electrical box 7 that has an engine control panel, and the electrical box 7 is therefore not directly affected by heat produced by the power generator 50.

The bottom surface of the power generator 50 and the front extension 67 of the second cover 60 are positioned above the top surface 6d of the intake silencer 6, and an air guide wall is formed by the front surface 6e of the intake silencer 6, whereby warm air is prevented from flowing into the area between the intake silencer 6 and the crankcase 5.

In order to cool the power generator 50, the plurality of air introduction holes 70 formed in the second cover 60, the duct portion 71 for expelling warm air, and the channel formed by the top surface of the intake silencer 6 and the bottom surface of the front extension 67 constitute a cooling air channel for cooling the power generator 50.

Figure 17:
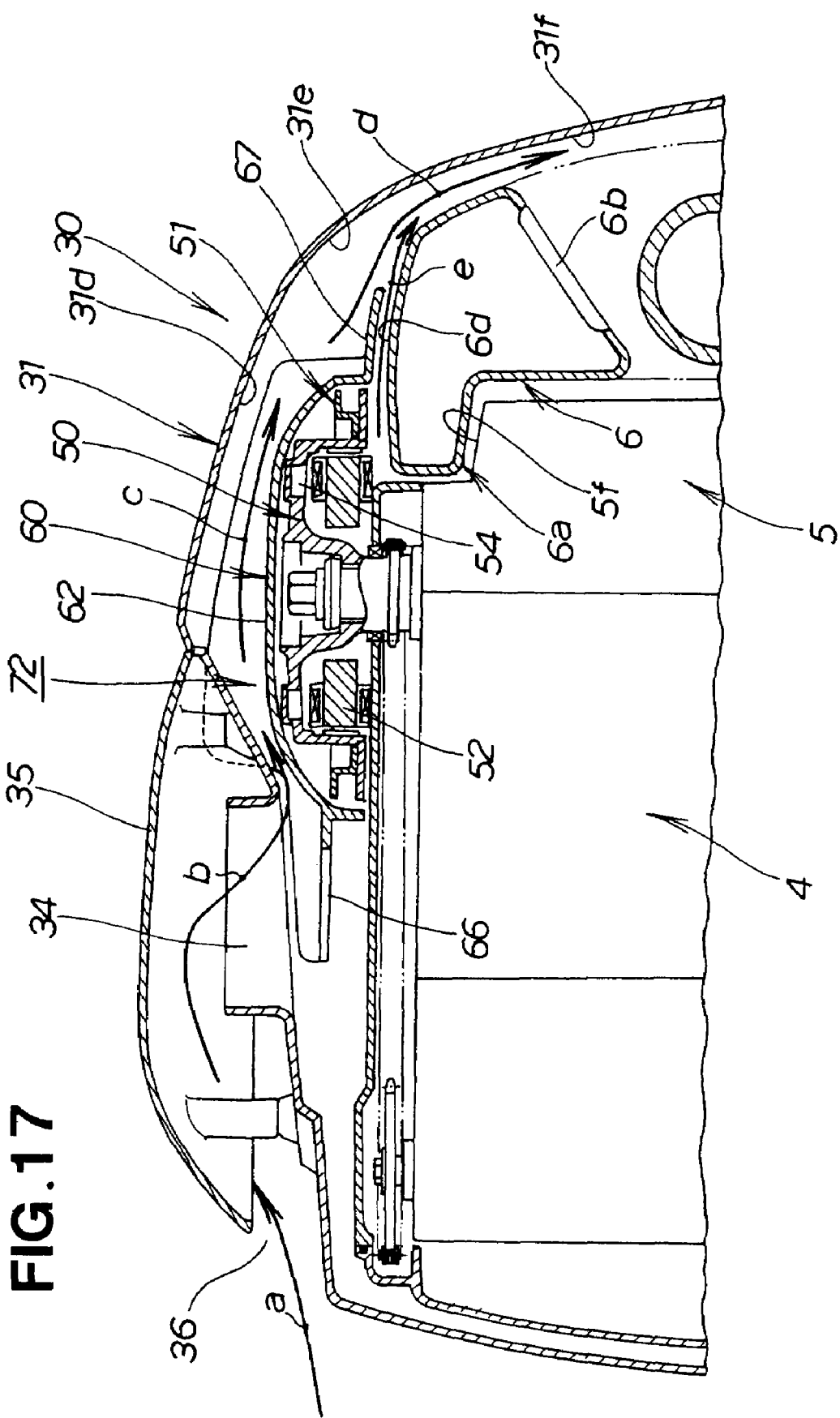
FIG. 17 is a cross-sectional view corresponding to FIG. 3 and showing the flow of outside air.

The flow of air taken into the engine cover 30 is described next with reference to FIG. 17.

Outside air enters from the aperture 36 formed in the rear portion of the top cover 31 and the lid 35, as indicated by the arrow a.

Air that has thus entered is brought from the outside air intake port 34 into the engine cover 30 in the manner indicated by the arrow b, and makes contact with the rear extension 66 of the second cover 60.

Air that has come into contact with the rear extension 66 is guided to a curved inner surface 31e along the ceiling inner surface 31d of the top cover 31 and the outside air guide channel 72 in the manner indicated by the arrow c, is directed downward along the front wall inner surface in the manner indicated by the arrow d, and is suctioned as fresh air into the intake port 6b of the intake silencer 6.

Rotation of the rotary member 51 of the power generator 50 causes the air that flows through the outside air guide channel 72 to be suctioned into the power generator 50 by way of a plurality of air introduction holes 70 (FIG. 9) formed in the ceiling portion 62 of the second cover 60 and a plurality of outside air introduction portions 54 disposed in the rotary member 51. The magneto coil 52 and other heat generation sources are cooled.

A portion of the warm air that has cooled the power generator 50 is expelled from below the duct portion 71 of the second cover 60 above the inlet manifold 19, as shown in FIG. 5.

The expelled air after having cooled the power generator 50 flows in the manner indicated by the arrow e through the cooling air channel, which is a gap formed by the bottom surface of the rotary member 51, the bottom surface of the front extension 67 of the second cover 60, and the top surface 6d of the intake silencer 6. The air is merged with and cooled by fresh air in the manner indicated by the arrow d, and is caused to flow downward. The expelled air therefore does not directly reach the intake port, which is the intake port 6b of the intake silencer 6.

Obviously, various minor changes and modifications of the present invention are possible in light of the above teaching. It is therefore to be understood that within the scope of the appended claims the invention may be practiced otherwise than as specifically described.

What is claimed is:

1. An outboard engine unit comprising:
    an engine having an engine block and a substantially vertically disposed crankshaft accommodated in the engine block;
    an engine cover constituting a portion of an engine space for accommodating the engine therein, the engine cover having an outside air intake port formed therein for introducing outside air into the engine cover;
    a box-shaped air intake silencer disposed forwardly of the engine and having an intake port formed on a surface other than those facing the engine, the intake port of the air intake silencer facing downward;
    electrical equipment mounted on the engine block and disposed below the intake port of the air intake silencer;
    a power generator disposed on the engine block and having a rotary member connected to an upper portion of the crankshaft for rotation therewith, the power generator being located between the outside air intake port of the engine cover and an intake port of the air intake silencer; and
    a generator cover mounted on the engine block and covering the power generator,
    wherein the generator cover and the engine cover define therebetween an outside air guide channel for guiding the outside air from a vicinity of the outside intake port of the engine cover toward the intake port of the air intake silencer,
    wherein the generator cover has a plurality of holes for introducing the outside air therefrom into the generator cover to cool the power generator, and a bulged duct portion formed in a peripheral wall of the generator cover for exhausting cooling air introduced into the power generator cover, the duct portion opening in a downward direction,
    wherein the rotary member has a plurality of apertures facing in a direction of rotation of the rotary member for introducing the outside air into the rotary member to cool the power generator, and
    wherein the holes in the generator cover, the apertures in the rotary member of the power generator and the duct portion of the generator cover jointly form a cooling air channel for cooling the power generator.

2. The outboard engine unit of claim 1, further comprising: hydraulic pressure devices for effecting pivotal movement of the engine unit about a tilt shaft; and an electric motor for driving the hydraulic pressure devices, wherein the electrical equipment is designed to drive-control the electric motor.

3. The outboard engine unit of claim 1, wherein the engine further has a camshaft drive mechanism disposed in an upper part of the engine block and covered by a sealed cover, the power generator is disposed above the sealed cover, and the sealed cover prevents lubricating oil from entering into the power generator.

4. The outboard engine unit of claim 1, wherein the air intake silencer has a protruding portion disposed between a top surface of the engine block and a bottom surface of the rotary member, the generator cover has a portion positioned at a slight gap above a top surface of the air intake silencer excluding the protruding portion, and
    wherein the bottom surface of the rotary member, the portion of the generator cover positioned at said slight gap above said top surface of said air intake silencer, the protruding portion of the air intake silencer and the top wall of the intake silencer excluding the protruding portion together form a part of the cooling air channel.

5. The outboard engine unit of claim 4, wherein the engine block has a stepped portion formed in the top surface thereof, and the protruding portion the air intake silencer is disposed in the stepped portion of the engine block to prevent cooling air from flowing directly into the intake port of the air intake silencer.

6. The outboard engine unit of claim 1, further comprising an electric box mounted on a first side of the engine block, wherein the duct portion of the generator cover is disposed on a second side of the engine block opposite to the first side.

7. The outboard engine unit of claim 1, wherein the generator cover includes a dome-shaped main body that covers the power generator, an upstream extension integral with and extending from an end of the main body to an area disposed below the outside air intake port of the engine cover, and a downstream extension integral with and extending from another end of the main body in a direction away from the upstream extension, the downstream extension positioned above the air intake silencer, and a pair of parallel spaced guide walls integral with a top surface of the dome-shaped main body and extending between the upstream extension and the downstream extension, and
    wherein a portion of the top surface of the dome-shaped main body which is defined by the pair of guide walls, a top surface of the upstream extension, and a top surface of the downstream extension jointly form a portion of the outside air guide channel, and the holes in the generator cover are formed in another portion of the top surface of the dome-shaped main body.

8. The outboard engine unit of claim 7, wherein the downstream extension extends over a top surface of the air intake silencer with a clearance defined therebetween, the clearance forming a portion of the cooling air channel.

* * * * *